Sept. 24, 1935.    G. W. HARPER    2,015,108
AXLE DRIVE LUBRICATING MEANS
Filed June 9, 1932    3 Sheets-Sheet 1

INVENTOR:
George W. Harper.
By Slough and Canfield
ATTORNEYS

Sept. 24, 1935.  G. W. HARPER  2,015,108
AXLE DRIVE LUBRICATING MEANS
Filed June 9, 1932   3 Sheets-Sheet 2
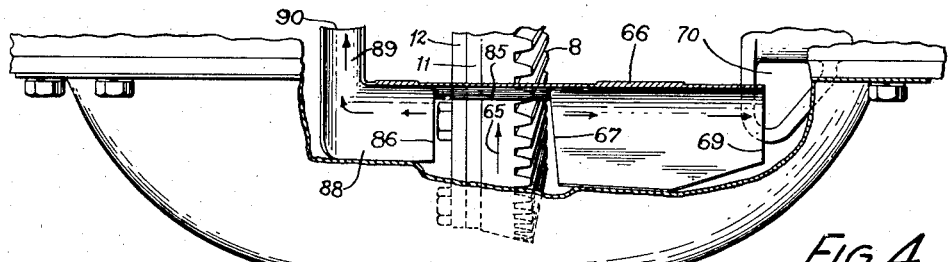
FIG. 4
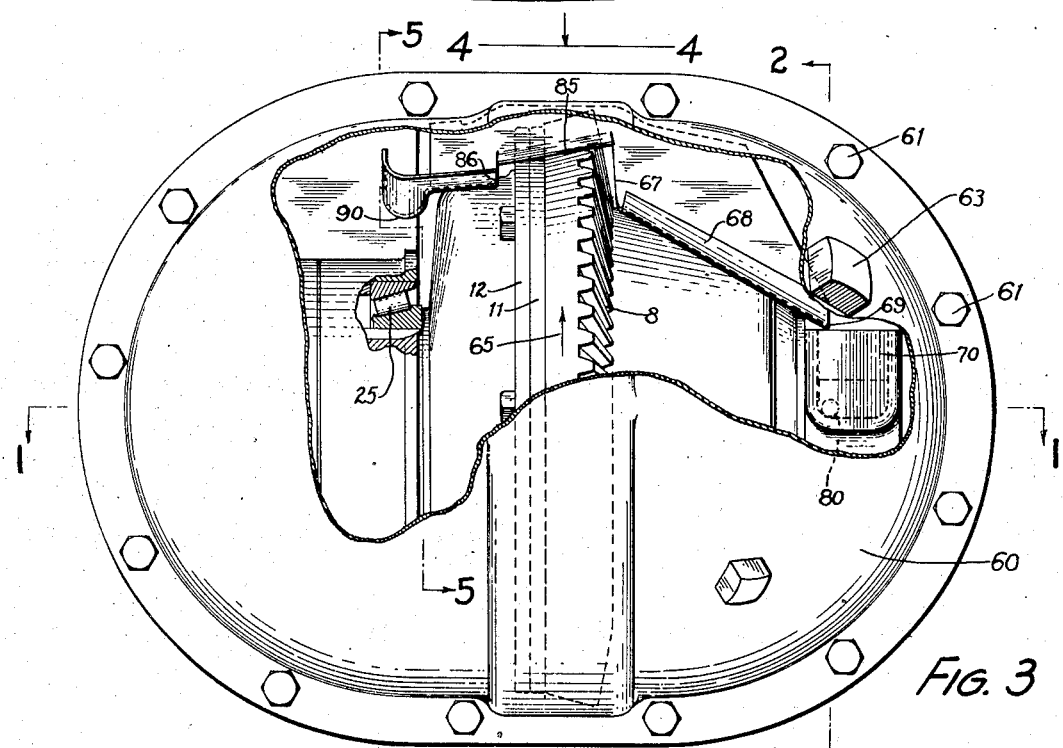
FIG. 3
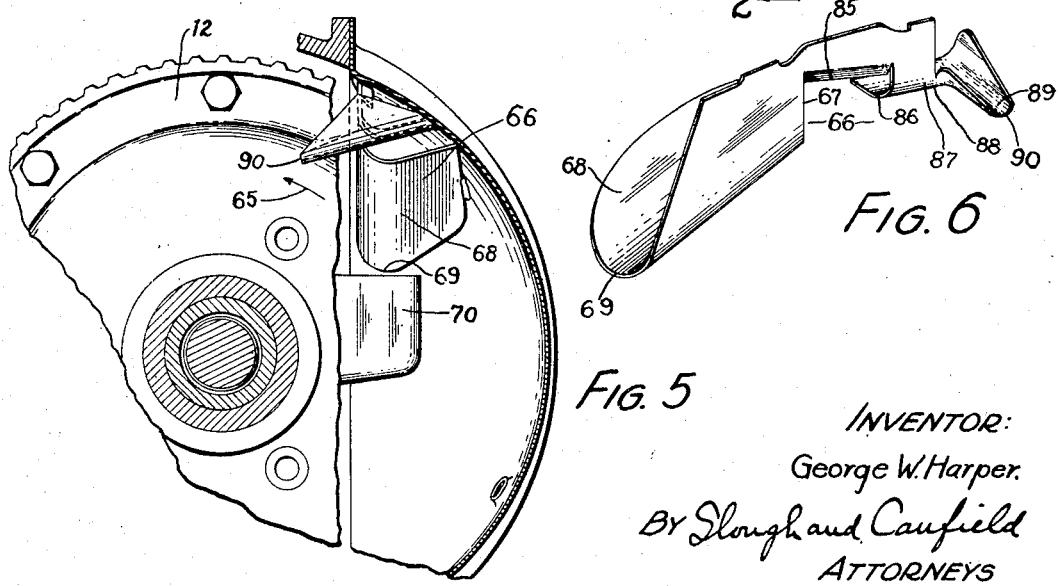
FIG. 5
FIG. 6
INVENTOR:
George W. Harper.
By Slough and Caufield
ATTORNEYS Sept. 24, 1935.  G. W. HARPER  2,015,108
AXLE DRIVE LUBRICATING MEANS
Filed June 9, 1932  3 Sheets-Sheet 3
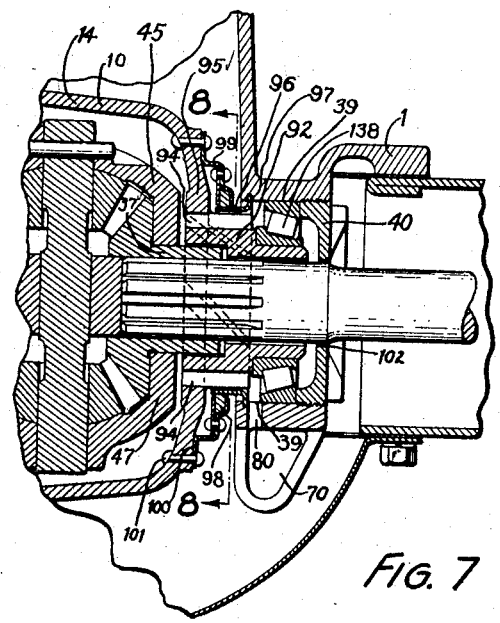
FIG. 7
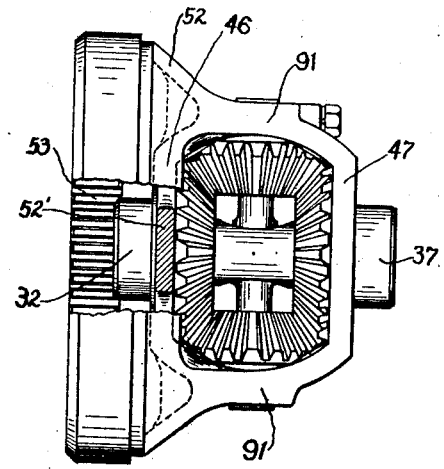
FIG. 11
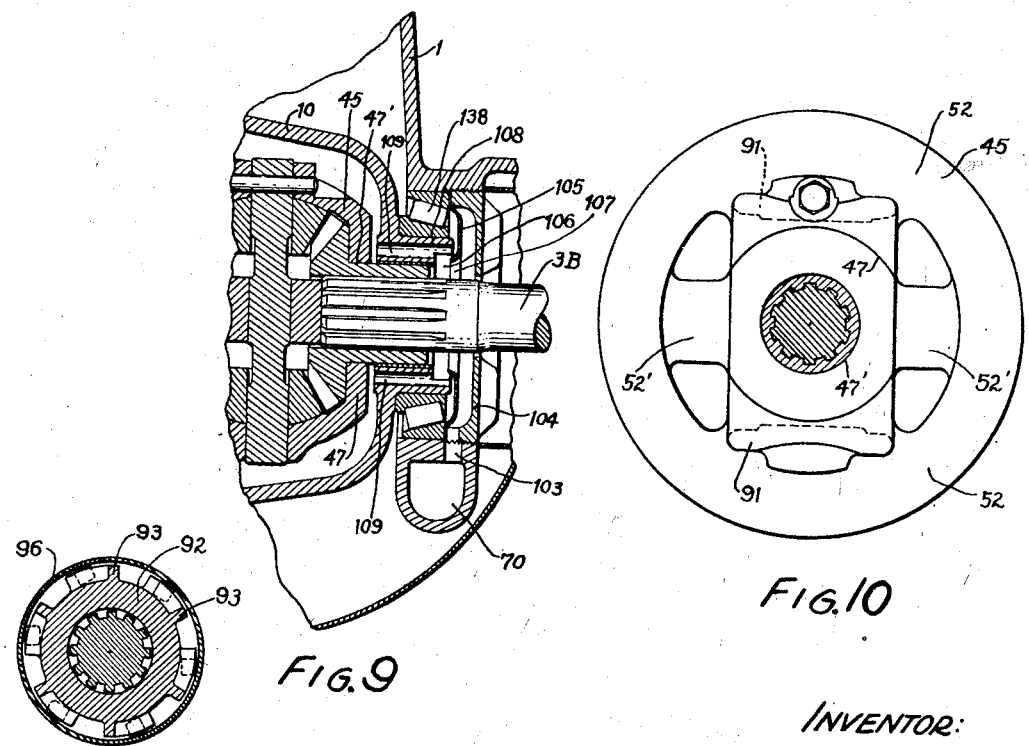
FIG. 9
FIG. 10
FIG. 8
INVENTOR:
George W. Harper.
By Slough and Canfield
ATTORNEYS Patented Sept. 24, 1935

2,015,108

UNITED STATES PATENT OFFICE 2,015,108

AXLE DRIVE LUBRICATING MEANS

George W. Harper, Cleveland, Ohio, assignor to The Columbia Axle Company, Cleveland, Ohio, a corporation of Ohio Application June 9, 1932, Serial No. 616,193

21 Claims. (Cl. 184—11)

This invention relates to lubricating means and relates more particularly to improved means for lubricating the gearing and bearings of the driving axle transmission mechanism of an automotive vehicle or the like, although in its broader phases my invention is not so limited.

Considerable difficulty has heretofore been had in efficiently lubricating the transmission mechanism of an automotive vehicle or like driving axle, comprising the differential pinions, gears, speed change gears, and bearings associated therewith, which are commonly located intra-peripherally of a large driving ring gear through which driving power is transmitted from the automotive vehicle engine to the driving axles of the vehicle through said gears, interposed between said driving axles and said ring gear.

This difficulty has been had chiefly due to the fact that quite viscous lubricant is employed, generally contained in a portion of the axle housing, and that the ring gear rotates through the lubricant collected in the bottom of the housing, and that by the effect of centrifugal force the lubricant is directed by said ring gear outwardly away from the radially inwardly disposed mechanism parts above referred to, being carried partly on the peripheral parts of the ring gear and partly deposited on the walls of the enclosing axle housing, and moved by gravity therefrom back to the bottom of the said housing.

It is an object of the present invention to utilize the effects of centrifugal force, which heretofore have operated to direct lubricant away from the said gears and bearings, to effect movement of lubricant to the same.

Another object is to provide a means of more efficiently lubricating intra-peripherally disposed elements of a driving axle transmission gear mechanism.

Another object is to provide an improved means for continuously circulating lubricant through the axle gearing of an automotive vehicle from a lubricant supply in the gearing housing of the axle.

Another object is to provide an improved means for utilizing the effects of viscosity and centrifugal force to circulate lubricant from a lubricant supply in the bottom of a vehicle driving axle housing, to and through the axle transmission gearing mechanism in the housing.

Other objects will be apparent to those skilled in the art to which my invention appertains.

My invention is fully disclosed in the following description taken in connection with the accompanying drawings, in which:—

Fig. 3 is a rear elevational view taken approximately from the plane 3—3 of Fig. 1 and with parts broken away for illustrative purposes;

Fig. 4 is a fragmentary view taken approximately from the plane 4—4 of Fig. 3;

Fig. 5 is a fragmentary sectional view taken approximately from the plane 5—5 of Fig. 3;

Fig. 6 is a view illustrating separately a lubricant collecting and distributing element forming part of the embodiment of my invention illustrated in Figs. 1 to 5 inclusive;

Fig. 7 is a fragmentary view similar to Fig. 1 illustrating a modification of my invention;

Fig. 8 is a sectional view of a part of Fig. 7, the view being taken approximately from the plane 8—8 of Fig. 7;

Fig. 9 is a view similar to Fig. 7 illustrating another modification;

Fig. 10 is an elevational view of a differential gear spider element which I may employ, and shown in section in Figs. 1, 7, or 9;

Fig. 11 is an elevational view partly in section of a spider element which I may employ.

Figure 2:
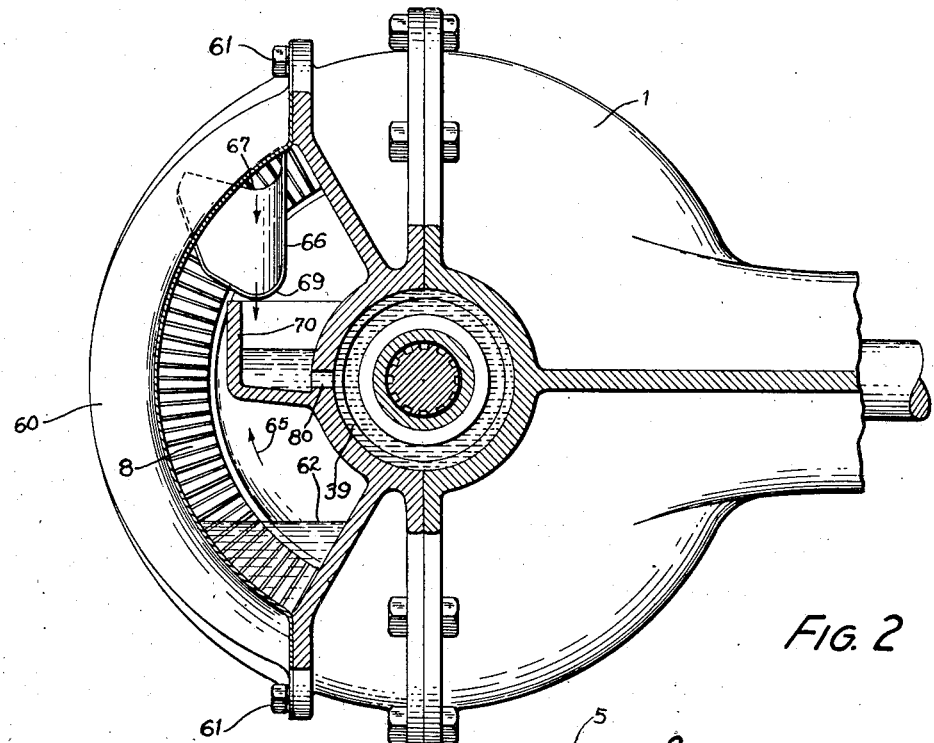
Fig. 2 is a cross-sectional view taken approximately from the plane 2—2 of Fig. 1.

Referring to the drawings, I have illustrated at 1 the intermediate housing portion of an automotive vehicle driving axle the housing being such as is commonly referred to as the differential housing. Connected with the housing 1 are oppositely extending housing portions 2—2 in which are axially disposed and axially aligned driving axles 3A—3B connected at their opposite ends to the vehicle wheels (not shown) and at their inner ends having splined portions 4—4 connected to power-transmitting gears to be described.

A propeller shaft 5 receiving power from the vehicle engine is rotatably supported by a bearing 6 in the housing 1 and carries on its end within the housing a driving pinion 7.

Power is transmitted from the pinion 7 to the axles 3A—3B through a two-speed and differential gear mechanism which will now be described.

The bevel pinion 7 is meshed with a ring gear 8 rigidly secured as by cap-screws 9—9 to a gearing housing 10, the screws 9 being projected through perforations in superimposed annular flanges 11 and 12 formed, preferably integrally, upon portions 14 and 13 of the gearing housing 10.

The housing portion 13 is preferably in the form of a shallow cup with the flange 12 at the open end of the cup and with a tubular coaxial extension 15 extending outwardly from the cup bottom. The outer wall of the tubular extension 15 is splined as at 16 and its inner wall has rotational bearing as at 17 upon a sleeve 18 through the bore of which one of the axles, 3A, extends.

Figure 1:
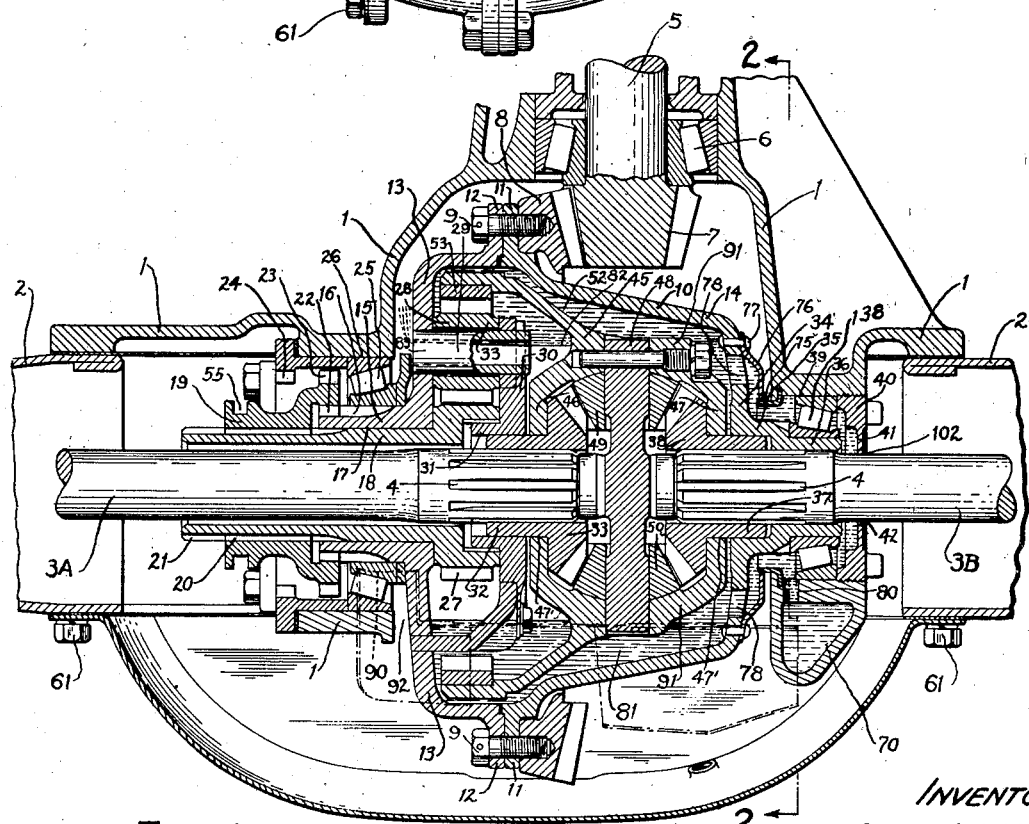
Fig. 1 is a horizontal cross-sectional view taken from the plane 1—1 of Fig. 3 of the gearing of an automotive vehicle driving axle in which my invention is embodied.

A sliding clutch element 19 is mounted for operative axially reciprocatory movement on the sleeve 18, having internal splines 20 meshed with external splines 21 on the outer wall of the sleeve 18 and having internal teeth 22 adapted to mesh with the splines 16 of the extension 15 when the clutch element 19 is reciprocated toward the right, as viewed in Fig. 1, and in which position it is illustrated.

The clutch element 19 also has external teeth 23, preferably opposite the teeth 22, adapted to be meshed with teeth 24 rigidly supported upon and relatively stationary with respect to an adjacent portion of the housing 1; and the teeth 23 may mesh with the teeth 24 when the clutch element is reciprocated toward the left as viewed in Fig. 1.

The tubular extension 15 and the sleeve 18 are supported in a roller bearing 25, the inner race element of which engages the outer wall of the extension 15 and the outer race element of which is pressed into a bore 26 in the housing 1 coaxial with the shaft 3A.

The inner end of the sleeve 18 is provided with gear teeth 27 and constitutes what may be called a sun gear.

A plurality of so-called planet gears 28 are disposed around the sun gear 27 meshed therewith and rotatably mounted on tubular shafts 29 secured at one end to the bottom of the cup-form housing portion 13, extending through the gears 28 and secured at their opposite ends to a transverse support 30 having a tubular central portion 31 coaxial of the shaft 3A, the inner wall of the tubular extension rotatably supporting a tubular hub 32 of a differential gear 33 telescoped over the splined portion 4 of the shaft 3A and having splines intermeshed therewith.

The other portion 14 of the housing 10 is generally of relatively deep cup-form, the wall of the cup being generally of frusto-conical form, the above mentioned flange 11 being formed preferably integrally on the outer larger open end of the cup, and the opposite relatively smaller cup bottom portion 34 having stepped tubular extensions 35 and 36 coaxially of the other shaft 3B, the tubular extension 35 having its inner wall rotatably supporting the tubular hub 37 of a differential gear 38 similar to the gear 33, the hub 37 being telescoped over the splined portion 4 of the shaft 3B and having splines intermeshed therewith. The tubular extension 36 is telescoped over the shaft 3B adjacent the splined portion 4 thereof.

The housing portion 14 is rotatably supported by a roller bearing 138 having an inner race element pressed over the tubular extension 36 and an outer race element pressed into a bore 39 in an adjacent portion of the housing 1.

The bore 39 is outwardly sealed by a nut 40 screw-threaded thereinto upon the outer race element of the bearing 138, the nut being generally of annular form and having a web portion 41, through an axially disposed perforation 42 of which the shaft 3B extends.

A differential spider 45 within the housing 10 has axially oppositely disposed generally circular wall portions 46 and 47, axially bored as at 47' to provide rotational bearing support therefor upon the gear hubs 32 and 37. The wall portions 46 and 47 are connected by bridging portions 91—91 extending generally parallel to the axis of the bores 47' and connecting diametrically opposite portions of the wall portion 46 with corresponding diametrically opposite portions of the wall portion 47. A generally frusto-conical wall 52 extends divergently from the bridging portions 91 and a pair of arms 52' extend divergently from the corresponding wall portion 46 to the conical wall 52. An annular orbit gear 53 meshed with the planet gears 28 is supported upon the outer termination of the wall 52. A transverse pin element 48 is supported at opposite ends in the spider bridging portions 91—91 and has rotatably mounted thereon, differential pinions 49 and 50 meshed with the differential gears 33 and 38.

As will be seen from the foregoing description, the housing 10 is rotatable within the housing 1 and its left end, as viewed in the drawings Fig. 1, is substantially closed by the engagement of the extension 15, sleeve 18, and by the engagement of the support 30 and spider portion 46 and gear hub 32. The right end of housing 10 as viewed in Fig. 1, at the tubular extensions 35 and 36, projects axially into the bore 39 of the housing 1. For a purpose to be described, this end of the housing 10 is so constructed that it may rotate relative to the housing 1 and at the same time have an externally closed communication between the interior of the housing 10 and the bore 39 of the housing 1. To provide such construction, a sleeve 75 is secured at the inner termination of the bore 39 upon the housing 1 and projects inwardly toward the housing 10; and an annular dished sheet metal disc 76 is riveted as at 77 to the housing 10 and disposed with the periphery of its central perforation telescoped over the sleeve 75; and the wall of the housing 10 inwardly of the outer periphery of the disc 76 is perforated as at 78—78. A communication is thus established from the interior of the housing 10 through the perforations 78—78 through the disc 76 and sleeve 75 to the interior of the bore 39.

The operation of the above described gearing mechanism for transmitting power from the propeller shaft 5 to the axle shafts 3A and 3B is as follows.

With the parts in the positions illustrated, the pinion 7 rotates the ring gear 8 and therewith the housing 10 upon the roller bearings 25 and 138. The housing portion 13 is locked with the sleeve 18 through the splines 16 and teeth 22 and splines 20 and 21, and thus the sun gear 27 rotates in unison with the housing 10; and the planet gears 28 on the shaft 29 move bodily without rotation with the housing 10 and carry the spider rotatably around with the housing 10, transmitting its rotational movement through the pinions 49 and 50 to the gears 33 and 38, rotating these gears and the shafts 3A and 3B splined therewith. The shafts 3A and 3B thus rotate with the velocity of the ring gear 8; and one shaft 3A or 3B may rotate at a different velocity from the other shaft with the well known differential movement of the gears 33 and 38 and pinions 49 and 50.

Upon shifting the clutch element 19 axially, toward the left as viewed in Fig. 1, by means of a shifter fork (not shown) and having suitable pins extending radially into a groove 55 in the clutch element, the teeth 22 are disengaged from the splines 16 and the teeth 23 become meshed with the teeth 24. Thereby, the sun gear 27 on the sleeve 18 is locked against rotation by the engagement of the splines 21 and 20 and the teeth 23 and 24.

Rotation of the ring gear 8 and housing 10 now revolve the shaft 29 around the sun gear 27 causing the planet gears 28 to be rotated on their shafts and causing the orbit gear 53 which is meshed with the gears 28 to be revolved at a speed greater than that of the housing 10 and the ring gear 8. The relatively high rotational velocity of the orbit gear 53 transmitted through the spider 45 and gears 33 and 38 rotates the shafts 3A and 3B at a velocity greater than that of the ring gear 8.

The power transmitting and speed change mechanism above described does not constitute an essential part of the present invention, inasmuch as it is substantially the same as that described in the patent to A. A. Wiedmaier, No. 1,815,689, issued July 21, 1931.

The housing 1 may be formed to have a relatively large rearward opening sealedly covered by a sheet metal cover plate 60 secured to the housing proper by screws 61—61. The housing 1, including the cover plate 60, thus completely encloses the above described gearing mechanism, and fluid lubricant is poured into this housing up to a suitable level as indicated at 62, Fig. 2, a filling orifice closable by a screw 63, Fig. 3, being provided in the cover plate 60.

The level 62 of the lubricant is sufficiently high to cover the teeth of the ring gear 8 and during the rotation of the gear, for example in the direction of the arrow 65, Figs. 2 to 5 inclusive, the lubricant will adhere to the ring gear and will be conveyed upwardly thereby into upper portions of the housing 1.

In an upper portion of the housing 1 provide a lubricant collecting and distributing device shown generally at 66 and illustrated separately in Fig. 6 for collecting from the ring gear lubricant elevated thereby and for distributing the lubricant so collected to bearing portions of the above described mechanism, some of the lubricant so distributed being applied directly to certain bearing surfaces, and another portion being supplied to a rotating portion of the mechanism by which it is caused to flow or circulate through the mechanism to lubricate other bearing surfaces, in a manner and by a means which will now be described.

In the particular embodiment of my invention illustrated, the collecting and distributing device 66 is formed by cutting and pressing operations from sheet metal and is secured to the inner wall of the sheet metal cover plate 60 by welding it thereto; but as will be apparent to those skilled in the art, the device 66 may be variously formed and constructed and variously supported in its functioning positional relation. For example, the device 66 may be formed integrally upon a portion of the housing 1.

However the device 66 may be formed and supported, I provide thereby an edge 67 disposed adjacent the rotating teeth of the ring gear 8 whereby lubricant elevated on the gear will be scraped off and may flow by gravity downwardly along an inclined trough 68, the trough terminating as at 69 above a receptacle 70 into which the lubricant falls from the end of the trough.

The receptacle 70 is preferably formed integrally with the housing 1, (see Figs. 1 and 2) projecting laterally from the housing and a duct 80 communicates between the interior of the receptacle 70 and the above described bore 39.

Lubricant dropped into the receptacle 70 thus may flow through the duct 80 into the bore 39 and thence through the sleeve 75 across the disc 76, through the perforation 78 and into the interior of the housing 10.

The rotation of the housing 10 will throw some of the lubricant, by the action of centrifugal force, outwardly radially against the inner wall of the housing 10. As above described and as plainly illustrated in Fig. 1, the portion 14 of the housing 10 is of frusto-conical form and thus the centrifugal force has an axial component which causes the lubricant to flow axially along the inner wall of the housing 10 toward the left as viewed in Fig. 1, the action of the housing 10 upon the lubricant being similar to that of a centrifugal pump.

By this action lubricant will collect in the housing 10 as illustrated at 81, Fig. 1, in the form of an annular mass on the inside of the housing 10, and as it gradually accumulates, the level thereof as at 82, will rise to the bore 83 of the tubular shaft 29. Upon a further increase of lubricant 81, it will begin to flow axially along the bore 83 and outwardly axially therethrough, out of the housing 10, and will be thrown against the inner wall of the housing 1 whence it may flow by gravity back to the bottom of the housing 1 where it again may be picked up by the ring gear 8 to repeat the cycle of movements just described.

A few revolutions of the ring gear 8 will be sufficient to supply enough lubricant in the housing 10 to cause it to begin to flow out through the bores 83 and thereafter, there will be a continuous flow of lubricant collected from the ring gear, and pumped through the housing 10, and this lubricant continually being renewed will thoroughly lubricate the bearing 138 and all of the sleeve bearings above described within the housing 10 as well as the teeth of the sun, planet and orbit gears therein and the teeth of the differential gears.

Lubrication of the planetary gearing may be effected by lubricant flowing around the outer periphery of the frusto-conical portion 52 of the spider to the orbit gear 53 and planet gears 28; or by lubricant flowing into the interior of the frusto-conical portion 52 over the differential gears 33, 49, 38. The bridging portions 91—91 of the spider, revolving successively through the annular mass of lubricant 81 direct lubricant inwardly of the bridging portions toward and upon the differential gears, whence it may flow by centrifugal force into the frusto-conical portion 52 and therethrough as described.

The device 60 is also provided with scraping or collecting edges 85 and 86 which collect lubricant from the outer periphery of the ring gear and from surface portions thereof opposite the ring gear teeth, such for example as on the flanges 11 and 12, and the lubricant so collected flows by gravity in a trough 87 first axially through an axial trough portion 88 and then at an angle thereto through a trough portion 89, finally dropping off of the end 90 of the trough portion 89 and falling upon and lubricating the bearing 25.

In Fig. 1, the end 90 of the trough portion 89 is indicated as in broken lines, showing its position directly above the bearing 25. Some of the lubricant may find access to the bearing 25 by flowing downwardly through the space 92 between the bearing raceways and the housing portion 13. Lubricant finding its way through and between the rollers of the bearing 25 will lubricate the splines 16, teeth 22 and 23, and splines 20 and 21.

Obviously, the ring gear itself and its pinion 7 will be lubricated by the lubricant on the ring gear teeth.

It will thus be observed that all the bearing parts of the above described mechanism including the two-speed power transmission and the differential gearing will be thoroughly lubricated by a continuously renewed supply of lubricant.

In the modification of my invention illustrated in Figs. 7 and 8, a somewhat different construction of parts is provided to conduct the lubricant from the receptacle 70 into the interior of the housing 10. A tubular extension 92, (corresponding to the tubular extension 35 of Fig. 1) has formed upon its outer generally cylindrical surface, a plurality of vanes 93—93 disposed therearound in generally helical configuration; and at the inner axial termination of the vanes 93, they have adjacent ports 94—94 in the adjacent cup bottom portion 95 of the cup-form portion 14 of the housing 10.

The vanes 93 are enclosed within a sheet metal tube 96 having a radial flange 97 by which it is supported coaxially of the bore 39, upon the housing 1, and the vanes 93 extend toward the right generally axially into the bore 39.

Lubricant in the receptacle 70 may flow through the duct 80 into the bore 39, and thence may flow toward the left axially between the vanes 93—93 and, by the rotation of the housing 10 to which the vanes are attached, the vanes will pump the lubricant through the tubular closure 96 and force it into the ports 94—94 to the interior of the housing 10.

The generally helical vanes 93 within their enclosing tube 96 thus constitute an efficient pump for transferring the lubricant from the receptacle 70 to the interior of the housing 10.

The portion 95 of the housing 10 and the enclosing tube 96 are sealed upon each other to permit relative rotation thereof and to constrain the lubricant to flow into the housing 10, by an annular packing 98 surrounding the enclosing tube 96 and secured to the housing portion 95 by being disposed in an annular groove formed in a sheet metal carrier 99 having an annular flange 100 riveted as at 101 to the housing portion 95 of the housing 10.

The lubrication of the bearings 138 in both of the forms of Fig. 1 and Fig. 7 is effected by lubricant flowing through the duct 80 into the bore 39, thence through the bearing 138 and thence through the perforation 102 in the nut 40 which holds the parts of the bearing 138 in position in the housing 1, and thence flowing back to the supply in the main housing 1.

In the form of my invention shown in Fig. 9, lubricant in the receptacle 70 flows through a duct 103 into the interior of the nut 104, corresponding to the nut 40 of the other figures. A perforated disc 105 is clamped between the nut 104 and the adjacent parts of the bearing 138 and serves as a baffle to cause the lubricant within the nut 104 to flow inwardly toward the shaft 3B. There the lubricant flows axially through a relatively large perforation 106 in the baffle 105 into an annular recess 107 in the adjacent end of a hub 108 on the housing 10. Thence lubricant flows through a plurality of ducts 109—109 extending substantially through the hub 108, communicating at one end with the recess 107 and at the other end with the interior of the housing 10.

If desired, the ducts 109 may be disposed at an angle to the rotational axis of the housing 10 to exert a pumping action on the lubricant. Some of the lubricant in the recess 107 may flow directly outwardly radially through the bearing 138 and thence into the housing 1 and back to the main reservoir.

In either of the forms of Figs. 7 or 9, as in the form of Fig. 1, lubricant entering the receptacle 70 goes part to the bearing 138 and the rest into the housing 10, and circulates therethrough with a pumping action and lubricates the bearings and gears therein.

In the above illustrated and described embodiments of my invention, lubricant entering the housing 10 is caused to flow generally axially through the housing by the action of centrifugal force upon the lubricant in connection with the outwardly flaring wall of the housing. While this is the preferred form of the housing 10, it is not essential. If the wall of the housing 10 were not flared, for example, if it were cylindrical, the lubricant introduced thereinto would accumulate therein up to the level of its outlet through the tubular shafts 29 and thereafter would circulate or flow through the housing and lubricate the bearing surfaces therein in a manner which it is believed will be clear without illustration or further description.

My invention is not limited to the exact details of construction illustrated and described hereinbefore. Other modifications and changes may be made within the scope and spirit of my invention without sacrificing its advantages.

I claim:

1. In combination with an axle drive gearing mechanism of the type comprising an outer stationary housing and an inner rotatable housing supported on and driven by a ring gear and containing power transmitting mechanism including a differential gear mechanism, a supply of fluid lubricant in the outer housing adapted to be raised to an elevation above normal by the rotation of external portions of the inner housing therethrough, a collecting device on the inner wall of the outer housing for collecting lubricant from the rotary inner housing and comprising a lubricant gravity flow outlet, a stationary receptacle supported by the main housing and disposed to receive lubricant from the outlet, and conducting means for conducting lubricant from the receptacle by gravity to the interior of the inner housing at a point relatively near its rotational axis, whereby the lubricant may flow into the inner housing, the inner housing being rotatable relative to the mechanism enclosed therein and formed to cause lubricant flowing thereinto to accumulate by centrifugal force upon inner wall portions thereof to a predetermined depth at which the gear mechanism therein may sweep therethrough and be lubricated thereby, and the inner housing having an outlet through which lubricant above the predetermined level may flow out of the inner housing and back into the outer housing.

2. The combination with a main housing and a rotatable, mechanism-containing, walled housing therein, of a supply of fluid lubricant in the main housing through which the rotatable housing rotates in a manner to raise a portion of the lubricant to an elevation above its normal level, a lubricant collecting device adapted to collect lubricant from the rotary housing at said elevation, and comprising a lubricant gravity flow outlet, a stationary receptacle supported by the main housing and disposed to receive lubricant from the outlet, and lubricant conducting means directing lubricant in the receptacle to flow by gravity directly to a portion of the inner wall surface of the rotatable housing adjacent its rotational axis, the rotatable housing having an outlet radially spaced from its axis, and the rotatable housing being formed to receive said conducted lubricant and to cause the lubricant to accumulate in a layer of predetermined thickness upon the inner wall of the rotatable housing by the action of centrifugal force on the lubricant therein, and to cause the accumulated lubricant to lubricate its contained mechanism and to cause the surplus lubricant to escape through the said outlet.

3. The combination with a main housing and a rotatable, mechanism-containing, walled housing therein, of a supply of fluid lubricant in the main housing through which the rotatable housing rotates in a manner to raise a portion of the lubricant to an elevation above its normal level, a stationary lubricant collecting device adapted to collect lubricant from the rotary housing at said elevation, and comprising a lubricant gravity flow outlet, a stationary receptacle supported by the main housing and disposed to receive lubricant from the outlet, lubricant conducting means for conducting collected lubricant by gravity from the receptacle directly to the interior wall surface of the rotatable housing, the rotatable housing having an inner wall portion formed for propelling lubricant through its contained mechanism to lubricate it by the action of centrifugal force on the lubricant, and for collecting lubricant therein to a predetermined amount and for propelling the excess lubricant out from the rotatable housing into the outer housing.

4. In combination with an axle drive gearing mechanism of the type comprising an outer housing and an inner rotatable housing driven by a ring gear and containing power transmitting gears, a supply of fluid lubricant in the outer housing through which the inner housing may rotate in a manner to raise lubricant to an elevation above normal, a collecting device on the inner wall of the outer housing for collecting lubricant from the rotating inner housing, and comprising a lubricant gravity flow outlet, a stationary receptacle supported by the main housing and disposed to receive lubricant from the outlet, conducting means for conducting collected lubricant from the receptacle by gravity directly to the interior surface of the inner housing at a point relatively near its rotational axis, the inner housing having an outwardly flaring lubricant engaging portion for causing lubricant therein to flow by centrifugal force therethrough axially to lubricate the said gears therein, and an outlet from the inner housing into the outer housing whereby lubricant may flow from the inner into the outer housing.

5. In combination with an axle drive gearing mechanism of the type comprising a rotatable inner housing rotatably driven by a ring gear and containing differential gears and speed change gears and rotary bearings therefor, and all enclosed within an outer housing, a supply of fluid lubricant in the outer housing through which the inner housing may rotate in a manner to raise lubricant to an elevation above normal, a collecting device on the inner wall of the outer housing for collecting lubricant from the ring gear, and conducting means for conducting collected lubricant from the collecting device by gravity directly to the interior surface of the inner housing at a point relatively near its rotational axis, the inner housing having an outwardly flaring lubricant engaging inner wall portion formed for causing lubricant therein to flow therethrough generally axially by centrifugal force to lubricate the said gears and bearings therein, and collecting a layer of lubricant therein of predetermined depth and an outlet from the inner housing to the outer housing through which excess lubricant may flow out of the inner housing into the outer housing.

6. In an axle drive construction, an axle housing, a lubricant supply reservoir in a lower portion thereof, a transmission mechanism in the housing comprising a rotary housing and a mechanism therein rotatable relatively thereto, the rotary housing being rotatable through the lubricant in the reservoir and adapted to elevate lubricant therein to an elevation above normal, a stationary lubricant collecting device for collecting elevated lubricant, lubricant conducting means for conducting collected lubricant to the interior of the rotary housing at a point adjacent its rotational axis while rotating, the rotary housing being formed to collect lubricant therein by the action of centrifugal force thereon in an annular layer of predetermined depth through which the transmitting mechanism may sweep to be lubricated, and an outlet in the rotary housing radially spaced from the axis to discharge excess lubricant back into the axle housing.

7. In an axle drive construction, an axle housing, a lubricant supply reservoir in a lower portion thereof, a transmission mechanism in the housing comprising a rotary housing and a mechanism therein rotatable relatively thereto, the rotational housing being supported on a pair of axially spaced bearings, the rotary housing being rotatable through the lubricant in the reservoir and adapted to elevate lubricant therein to an elevation above normal, a stationary lubricant collecting device for collecting elevated lubricant, lubricant conducting means for conducting collected lubricant to one of the bearings and to the interior of the rotary housing at a point adjacent its rotational axis while rotating, and for conducting lubricant directly to the other bearing, the rotary housing being formed to collect lubricant therein by the action of centrifugal force thereon in an annular layer of predetermined depth through which the transmission mechanism may sweep to be lubricated, and an outlet in the rotary housing radially spaced from the axis to discharge excess lubricant back into the axle housing.

8. In a multi-speed transmission mechanism for driving the axle of an engine driven vehicle, a rotary driving element connected to the engine, a multi-speed ratio transmission connected to the driving element and to the axle to drive the axle at selected speed ratios, by power from the driving element, speed change mechanism to change the speed ratio of transmission between the driving element and axle, an axle housing enclosing the driving element, the multi-speed transmission, and a portion of the axle and comprising a lubricant reservoir in a lower portion of the housing, a quantity of lubricant therein through which a portion of the rotary driving element may sweep and elevate lubricant therefrom to a point above the lubricant level in the reservoir, lubricant collecting means supported on a wall portion of the axle housing comprising means to collect elevated lubricant, a lubricant receptacle having an outlet and disposed to supply lubricant from the outlet to the transmission mechanism to lubricate it, and means for conducting collected lubricant by gravity to the receptacle.

9. In a power transmission mechanism for automotive vehicles to transmit engine power to a vehicle driving axle, a pair of axle elements, differential gearing connecting the axle elements, a rotary driven element for driving the axle elements through the differential, and a rotary driving element for receiving power from the engine, a multi-speed transmission mechanism between the driven and driving elements for transmitting engine power at selected speed ratios, speed change mechanism to change the speed ratio of transmission, a housing enclosing the driving element, the driven element, the differential gearing and multi-speed ratio transmission mechanism, comprising a lubricant reservoir in the lower portion of the housing, a quantity of lubricant therein through which a portion of the rotary driving element may sweep and elevate lubricant therefrom to a point above the lubricant level in the reservoir, lubricant collecting means supported on a wall portion of the housing comprising means to collect elevated lubricant, a lubricant receptacle having an outlet and disposed to supply lubricant from the outlet to the said driving and driven elements and differential gearing and transmission mechanism to lubricate them, and means for conducting collected lubricant by gravity to the receptacle.

10. In a multi-speed transmission mechanism for driving the axle of an engine driven vehicle, a first driven gear element connected to the axle to drive it, a second driving gear element for receiving power from the engine, multi-speed ratio transmission gearing between the first and second gear elements comprising a planet gear, and a sun gear and orbit gear meshed therewith, and speed change mechanism comprising means to optionally connect the sun gear to a stationary housing portion of the vehicle or to cause the orbit gear, sun gear and second gear to rotate in unison, a housing enclosing the driving and driven gear elements and multi-speed ratio gearing, comprising a lubricant reservoir in a lower portion of the housing, a quantity of lubricant therein through which a portion of the second gear element may sweep and elevate lubricant therefrom to a point above the lubricant level in the reservoir, lubricant collecting means supported on the wall portion of the housing comprising means to collect elevated lubricant, a receptacle having an outlet and disposed to supply lubricant from the outlet to the first gear element and multi-speed transmission gearing to lubricate them, and means for conducting collected lubricant by gravity to the receptacle.

11. In a power transmission mechanism for automotive vehicles to transmit engine power to a vehicle driving axle, a pair of axle elements, differential gearing connecting the axle elements including a first gear for driving the axle elements through the differential gearing, and a second gear for receiving power from the engine, multi-speed ratio transmission gearing between the first and second gears, comprising a planet gear, and a sun gear and the first gear being meshed with the planet gear, and speed change means comprising means to optionally connect the sun gear to a stationary housing portion of the vehicle or to cause the first gear, sun gear and second gear to rotate in unison, a housing enclosing the first gear and second gear, differential gearing and multi-speed transmission gearing, comprising a lubricant reservoir in the lower portion of the housing, a quantity of lubricant therein through which a portion of the second gear may sweep and elevate lubricant therefrom to a point above the lubricant level in the reservoir, lubricant collecting means supported on a wall portion of the housing comprising means to collect elevated lubricant, a lubricant receptacle having an outlet and disposed to supply lubricant from the outlet to the first gear element, the differential, and the multi-speed transmission gearing to lubricate them, and means for conducting collected lubricant by gravity to the receptacle.

12. In a power transmission mechanism for automotive vehicles to transmit engine power to a vehicle driving axle, a first gear for driving the axle, a second gear for receiving power from the engine, multi-speed ratio transmission gearing between the first and second gears comprising a planet gear associated with the second gear and meshed with the first gear and a sun gear meshed with the planet gear, and speed change means comprising means to optionally connect the sun gear to a stationary housing portion of the vehicle or to the second gear, a housing enclosing the first gear, second gear and multi-speed transmission gearing comprising a lubricant reservoir in the lower portion of the housing, a quantity of lubricant therein through which a portion of the second gear may sweep and elevate lubricant therefrom to a point above the lubricant level in the reservoir, lubricant collecting means supported on a wall portion of the housing comprising means to collect elevated lubricant, a receptacle having an outlet and disposed to supply lubricant from the outlet to the first gear and multi-speed ratio transmission to lubricate them, and means for conducting collected lubricant by gravity to the receptacle.

13. In a power transmission mechanism for automotive vehicles to transmit engine power to a vehicle driving axle, a pair of axle elements, differential gearing connecting the axle elements, a first gear for driving the axle elements through the differential gearing, and a second gear for receiving power from the engine, multi-speed ratio transmission gearing between the first and second gears, comprising a planet gear associated with the second gear and meshed with the first gear and a sun gear meshed with the planet gear, and speed change means comprising means to optionally connect the sun gear to a stationary housing portion of the vehicle or to the second gear, a housing enclosing the first gear, second gear, differential gearing and transmission gearing and comprising a lubricant reservoir in a lower portion of the housing, a quantity of lubricant therein through which a portion of the second gear may sweep and elevate lubricant therefrom to a point above the lubricant level in the reservoir, lubricant collecting means supported on a wall portion of the housing comprising means to collect elevated lubricant, a receptacle having an outlet and disposed to supply lubricant from the outlet to the first gear, the differential gearing and the multi-speed transmission gearing to lubricate them, and means for conducting collected lubricant by gravity to the receptacle.

14. In a transmission mechanism for driving the axle of an automotive vehicle, a rotary driving element connected to the engine, an inner housing supported by and rotatable with the driving element, a multi-speed ratio transmission in the inner housing connected to the driving element and to the axle to drive the axle at selected speed ratios by power from the driving element, speed change mechanism to change the speed ratio of transmission, an outer housing enclosing the driving element and the inner housing and comprising a lubricant reservoir in the lower portion of the housing, a quantity of lubricant therein through which a portion of the driving element may sweep and elevate lubricant therefrom to a point above the lubricant level in the reservoir, lubricant collecting means supported on a wall portion of the outer housing comprising means to collect elevated lubricant, means for conducting collected lubricant into a generally central portion of the inner housing, the inner housing being rotatable relative to the multi-speed transmission therein and being formed to cause lubricant conducted thereinto to flow by a centrifugal force outwardly to form a layer of predetermined depth therein through which the multi-speed transmission may relatively sweep to lubricate it, and a lubricant outlet for excess lubricant by which it may flow from the inner housing back into the reservoir.

15. In a transmission mechanism for transmitting engine power to the driving axles of an automotive vehicle, a rotary driving element connected to the engine, an inner housing supported by and rotatable with the driving element, a differential mechanism in the housing connected to the axles, a multi-speed ratio transmission in the inner housing connected to the rotary driving element and to the differential mechanism to differentially drive the axles at selected speed ratios by power from the driving element, speed change mechanism to change the speed ratio of the transmission, an outer housing enclosing the driving element and the inner housing and comprising a lubricant reservoir in a lower portion of the housing, a quantity of lubricant therein through which a portion of the driving element may sweep and elevate lubricant therefrom to a point above the lubricant level in the reservoir, lubricant-collecting means supported on a wall portion of the outer housing comprising means to collect elevated lubricant, means for conducting collected lubricant into a generally central portion of the inner housing, the inner housing being rotatable relative to the multi-speed transmission and differential mechanism therein and being formed to cause lubricant conducted therein to flow by centrifugal force outwardly to form a layer of predetermined depth therein through which the multi-speed transmission and differential mechanism may relatively sweep to lubricate them, and a lubricant outlet for excess lubricant by which it may flow from the inner housing back to the reservoir.

16. In a transmission mechanism for driving the axle of an automotive vehicle, a rotary driving element connected to the engine, an inner housing supported by and rotatable with the driving element, a multi-speed ratio transmission in the inner housing connected to the driving element and to the axle to drive the axle at selected speed ratios by power from the driving element and comprising a planet gear, a sun gear and an orbit gear meshed therewith, and speed change mechanism comprising means to optionally connect the sun gear to a stationary housing portion of the vehicle or to cause the orbit gear, sun gear and rotary driving element to rotate in unison, an outer housing enclosing the driving element and the inner housing and comprising a lubricant reservoir in the lower portion of the housing, a quantity of lubricant therein through which a portion of the driving element may sweep and elevate lubricant therefrom to a point above the lubricant level in the reservoir, lubricant-collecting means supported on a wall portion of the outer housing comprising means to collect elevated lubricant, means for conducting collected lubricant into a generally central portion of the inner housing, the inner housing being rotatable relative to the multi-speed transmission therein and being formed to cause lubricant conducted thereinto to flow by a centrifugal force outwardly to form a layer of predetermined depth therein through which the multi-speed transmission may relatively sweep to lubricate it, and a lubricant outlet for excess lubricant by which it may flow from the inner housing back into the reservoir.

17. In a transmission mechanism for transmitting engine power to the driving axles of an automotive vehicle, a rotary driving element connected to the engine, an inner housing supported by and rotatable with the driving element, a differential mechanism in the housing connected to the axles, a multi-speed ratio transmission in the inner housing connected to the rotary driving element and to the differential mechanism to differentially drive the axles at selected speed ratios by power from the driving element, and comprising a planet gear, a sun gear and an orbit gear meshed therewith, and speed-change mechanism comprising means to optionally connect the sun gear to a stationary housing portion of the vehicle or to cause the orbit gear, sun gear and rotary driving element to rotate in unison, an outer housing enclosing the driving element and the inner housing and comprising a lubricant reservoir in the lower portion of the housing, a quantity of lubricant therein through which a portion of the driving element may sweep and elevate lubricant therefrom to a point above the lubricant level in the reservoir, lubricant collecting means supported on a wall portion of the outer housing comprising means to collect elevated lubricant, means for conducting collected lubricant into a generally central portion of the inner housing, the inner housing being rotatable relative to the multi-speed transmission therein and being formed to cause lubricant conducted thereinto to flow by a centrifugal force outwardly to form a layer of predetermined depth therein through which the multi-speed transmission and differential mechanism may relatively sweep to lubricate it, and a lubricant outlet for excess lubricant by which it may flow from the inner housing back into the reservoir.

18. In a transmission mechanism for driving the axles of an automotive vehicle, a driving gear connected to the engine, an inner housing supported by and rotatable with the said gear, a differential mechanism in the inner housing connected to the axles, a driven gear in the inner housing connected to the differential mechanism, a multi-speed ratio transmission in the inner housing connected between the driving and driven gears to differentially drive the axles through the transmission by power from the driving gear at selected speed ratios, the multiple speed ratio mechanism comprising a planet gear associated with the driving gear and meshed with the driven gear and a sun gear meshed with the planet gear and speed change means comprising means to optionally connect the sun gear to a stationary housing portion of the vehicle or to the driving gear, an outer housing enclosing the driving gear and the inner housing and comprising a lubricant reservoir in a lower portion of the housing, a quantity of lubricant therein through which a portion of the driving gear may sweep and elevate lubricant therefrom to a point above the lubricant level in the reservoir, lubricant collecting means supported on a wall portion of the outer housing comprising means to collect elevated lubricant, means for conducting collected lubricant into a generally central portion of the inner housing, the inner housing being rotatable relative to the multi-speed transmission and differential therein and being formed to cause lubricant conducted thereinto to flow by a centrifugal force outwardly to form a layer of predetermined depth therein through which the multi-speed transmission and differential mechanism may relatively sweep to lubricate them, and a lubricant outlet for excess lubricant by which it may flow from the inner housing back into the reservoir.

19. In an axle drive construction, an axle housing, a lubricant supply reservoir in a lower portion thereof, a transmission mechanism in the housing comprising a rotary housing and a mechanism therein rotatable relatively thereto, the rotary housing being supported by a hub portion engaging axially spaced bearings, the rotary housing being rotatable through the lubricant in the reservoir and adapted to elevate lubricant therein to an elevation above normal, stationary means for collecting elevated lubricant and conducting the same to a hub portion of the rotatable housing, the rotatable housing being provided with an inclined annular portion radially outwardly of the hub portion and extending axially outwardly along the hub portion, and the housing being provided with lubricant perforations intermediate the hub portion and the annular portion thereof whereby lubricant due to centrifugal force will be projected from the hub portion against the annular portion through the perforations to the interior of the rotary housing.

20. In an axle drive construction, an axle housing, a lubricant supply reservoir in the lower portion thereof, a transmission mechanism in the housing comprising a rotary housing and a mechanism therein rotatable relatively thereto, the rotary housing being supported by a hub portion engaging axially spaced bearings, the rotary housing being rotatable through the lubricant in the reservoir and adapted to elevate lubricant therein to an elevation above normal, stationary means for collecting elevated lubricant and conducting the same by gravity to the rotary housing hub portions and associated bearings, the rotary housing being provided with an inclined annular portion radially outwardly of one of the hub portions and extending axially outwardly along the hub portion, the housing being provided with lubricant perforations intermediate said hub portion and annular portion thereof whereby lubricant due to centrifugal force will be projected from the said hub portion against the annular portion and through the perforations to the interior of the rotary housing.

21. In a transmission mechanism for driving the axle of an automotive vehicle, a first gear connected to the axle to drive it, a second gear connected to the engine, a first housing encasing the first gear supported by and rotatable with the second gear, a multi-speed ratio transmission mechanism in the first housing connected between the first gear and second gear to drive the axle at selected speed ratios by power from the second gear, comprising a planet gear associated with the second gear and meshed with the first gear and a sun gear meshed with the planet gear, speed change means comprising means to optionally connect the sun gear to a stationary housing portion of the vehicle or to the second gear, a second outer housing enclosing the second gear in the first housing and comprising a lubricant reservoir in the lower portion of the outer housing, a quantity of lubricant therein through which a portion of the second gear may sweep and elevate lubricant therefrom to a point above the lubricant level in the reservoir, lubricant collecting means supported in a wall portion of the outer housing comprising means to collect elevated lubricant, means for conducting collected lubricant into a generally central portion of the first housing, the first housing being rotatable relative to the multi-speed transmission therein and being formed to cause lubricant conducted thereinto to flow by centrifugal force outwardly to form a layer of predetermined depth therein through which the multi-speed transmission may relatively sweep to lubricate it, and a lubricant outlet for said lubricant by which it may flow from the first housing back into the reservoir.

GEORGE W. HARPER.